United States Patent
Blenn

[11] Patent Number: 6,019,312
[45] Date of Patent: Feb. 1, 2000

[54] AIRSHIP TAIL FIN CONSTRUCTION FOR IMPROVED CONTROL

[76] Inventor: Jesse Blenn, Rte. 2 Box 53-4, Elba, Ala. 36323

[21] Appl. No.: 08/938,467

[22] Filed: Feb. 28, 1997

Related U.S. Application Data

[62] Division of application No. 08/378,653, Jan. 26, 1995, abandoned.

[51] Int. Cl.[7] ................................................. B64C 19/00
[52] U.S. Cl. ............................................. 244/51; 244/96
[58] Field of Search .................................. 244/51, 52, 56, 244/87, 96, 215

[56] References Cited

U.S. PATENT DOCUMENTS

| | | |
|---|---|---|
| 986,002 | 3/1911 | Hipssich . |
| 1,225,711 | 5/1917 | Holle . |
| 1,558,063 | 10/1925 | Thomas .................................. 244/109 |
| 1,609,978 | 12/1926 | Wagner .................................... 244/87 |
| 1,623,952 | 4/1927 | Arnstein . |
| 1,623,962 | 4/1927 | Arnstein ................................... 244/96 |
| 1,725,222 | 8/1929 | Stelzer . |
| 1,775,604 | 9/1930 | Schulz ...................................... 244/87 |
| 1,778,892 | 10/1930 | Fokker ..................................... 244/87 |
| 1,780,410 | 11/1930 | Tupta ....................................... 244/87 |
| 1,812,237 | 6/1931 | Garcia .................................... 244/116 |
| 1,840,683 | 1/1932 | Vance ...................................... 244/82 |
| 1,855,695 | 4/1932 | Snyder ..................................... 244/87 |
| 1,886,362 | 11/1932 | Antoni . |
| 1,945,254 | 1/1934 | Bittner ..................................... 244/29 |
| 1,977,392 | 10/1934 | Mackenzie ................................. 244/6 |
| 2,010,549 | 8/1935 | Maring ..................................... 244/12 |
| 2,081,957 | 6/1937 | Roche ...................................... 244/87 |
| 2,160,850 | 6/1939 | Forton ..................................... 244/62 |
| 2,186,558 | 1/1940 | Rouanet ................................... 244/38 |
| 2,191,759 | 2/1940 | Hilberth ................................... 244/30 |
| 2,379,355 | 6/1945 | Hodgdon .................................. 244/25 |
| 2,383,845 | 8/1945 | Louzinet ............................... 244/75 R |
| 2,384,933 | 9/1945 | Lee .......................................... 244/44 |
| 2,386,814 | 10/1945 | Rosendahl .............................. 244/116 |
| 2,461,747 | 2/1949 | Leonard et al. ......................... 244/38 |
| 2,472,763 | 6/1949 | Rodeck .................................... 244/87 |
| 2,670,909 | 3/1954 | Replogle .............................. 244/75 R |
| 3,180,589 | 4/1965 | Fritzpatrick ............................ 244/109 |
| 3,332,383 | 7/1967 | Wright ..................................... 114/39 |
| 3,415,468 | 12/1968 | Labombarde ............................ 244/55 |
| 3,897,032 | 7/1975 | Papst ........................................ 244/96 |
| 4,553,722 | 11/1985 | Cole ......................................... 244/21 |
| 5,277,381 | 1/1994 | Piasecki ................................... 244/51 |

FOREIGN PATENT DOCUMENTS

| | | | |
|---|---|---|---|
| 534772 | 4/1922 | France ..................................... 244/38 |

OTHER PUBLICATIONS

V.C. Richmond, "R101", 1929, pp. 13–14.
C.P. Burgess, "Alternative Methods of Airship Propulsion," 1936, p. 3.
Strojnik, "Laminar Aircraft Design", 1983 pp. 31, 138–140.

*Primary Examiner*—Galen L. Barefoot

[57] ABSTRACT

Airship tail fins (20) deflect under excessive load on axii (108,110) to protect the airship hull (22) and also reduce angles of attack to disturbing airflow. A propulsion engine (24) may be mounted to the tail fin structure. A longitudinally elongated roller (36) may be mounted to the lower tail fin to act as landing gear. Two widely separated lower tail fins may control pitch and roll when moored by providing secure attachment points, as at shaft (38), for ground handling.

10 Claims, 2 Drawing Sheets

AIRSHIP TAIL FIN CONSTRUCTION FOR IMPROVED CONTROL (This is a division of application Ser. No. 08/378.653, filing date Jan. 26, 1995, abandoned, originally entitled "Airship Tail Fin Construction for Improved Control" and comprising 25 claims. In response to Office Action Summary dated Sep. 30, 1996 this division pertains to Group IV, Claims 18–23 of the original application, drawn to fin attachment, classified in Class 244, subclass 87, with substitute specifications containing no new matter and additional amended claims. Examiner Galen Barefoot, Art Unit 3104.)

FIELD OF THE INVENTION

This invention relates to aircraft, and, in particular, to improvements in the attachment of airship tail fins and related features.

BACKGROUND OF THE INVENTION

1. Description of the Problem

Stabilization of airships has normally been accomplished by the use of tail fins near the stern, to which are attached movable control surfaces of a size sufficient to maintain or change the angle of incidence of the airship hull relative to airflow in forward flight. Due to their necessary large size, clearance between tail fins and the ground or other obstacles has been a problem. While small buffer wheels have sometimes been used on the bottom of tail fins, but considering the fins delicate nature in the interest of light weight, they have not been designed to withstand the high loads of ground strikes. They have also been damaged by excessive wind gusts in flight. Tail fins designed to carry high loads into the airship structure subject it to abrupt and uncomfortable movement, as well as necessitating a strong, and thus heavy, structure.

When near the ground as in takeoff, landing, loading, or docking operations airships are handled by a numerous ground crew handling ropes attached to the airship. Part of their job is to avoid tail strikes to the ground. However, as with ropes they can only pull downward or sideward their effect is useless when an odd wind gust forces the tail downward. Thus tail strikes to the ground cannot be avoided altogether, and continue to occur. This has had a part in lowering the public image of airships as practical aircraft and thus their economic viability, restricting their use.

As larger airships are again being built, the use of semi rigid and rigid construction will see a revival, and the problem of limiting serious damage to the tail structures and their attachment to the rigid framing will again be a problem.

As one of the major components of an airship, the weight of engines subject the airship structures to concentrated inertia loads during fast maneuvers, gust encounters, and ground handling. Similar to excessive loads to the tail fins, such loads can damage the airship structure or require it to be built unduly heavy to withstand them.

When engines and landing gear are mounted near the middle length of the airship, the concentration of mass leads to reduced inertial resistance to pitching and yawing and a more unstable airship. While highly desirable for passenger comfort and stability, and sometimes proposed, the location of engines in solidly mounted airship tails will subject the airship structure to excessive inertial bending loads in gust encounters or hard landings.

The exposed landing gear of airships cause considerable drag and risk of catching on obstacles. To allow a vertical travel to dissipate loads, they add unduly to the height of the airship, making maintenance, hangar clearance, and comfortable passenger entry and exit a problem.

Another important consideration is safely and accurately locating the airship for movement in and out of hangars and near obstacles, without subjecting the airship structure to excessive or unduly concentrated loadings. While a nose mooring attachment provides a secure, and often resilient, attachment point forward when used with a mobile mooring mast, airships have lacked an effective means of resiliently locating the rear of the airship relative to the ground or obstacles. Rear handling lines need a complex attachment system and add to aerodynamic drag, while providing little protection against rolling or downward movement at the tail. This has severely limited the wind conditions in which airships can be safely maneuvered on the ground and maximizes the necessary side clearances for safe hangaring, necessitating oversize hangars and, again, large ground crews.

BACKGROUND OF THE INVENTION

2. The Prior Art

Two means of attaching airship tail fins to the airship hull have been used. On nonrigid airships the tail fin base is tied to the flexible hull and brace cables extend from widely separated locations on the hull surface to the tail fin centerline or tip to locate it perpendicular to the airship hull. Such cables add considerable drag, as well as complexity and greater risk of catching on obstacles. Because of this, brace cables were often eliminated in the construction of rigid and semirigid airships having an internal frame to which tail fins could be rigidly attached. However, these lacked resiliency and, due to the necessary light construction, lacked the strength to carry excessive landing or aerodynamic loads, leading to damage and some notable disasters.

In existing airships, one or two landing wheels using rubber tires and a vertical axis swivel are attached to the airship car and located some 40 to 50% aft of the nose. As the engines are generally mounted to the car, this location is necessary to provide a relatively direct path of engine inertial loads to the ground in hard landings. This allows the unsupported stern of the airship much freedom to move up and down with the wind or "kite" when moored by the nose as is the usual practice. Tall and aerodynamically inefficient cars are used to help keep the tails at a safer height above the ground, which of course complicates their maintenance. A constant watch is still necessary to adjust the airship attitude and prevent damage from ground strikes to the fragile lower tail fin, often by varying ballast weights in the airship car. Still, damage to a lower tail fin is a common occurrence. This problem can be reduced by adopting an "X" or inverted "Y", rather than the more common cruciform tail fin mounting pattern, to give more ground clearance. However, ground strikes are still possible unless the tail fins are made ineffectively small, especially when the airship rolls and falls heavily with wind shifts, as they do. It is also difficult or even dangerous to board the airship car or exchange loads while it is rising and falling or rolling.

Airships now use landing gear free to swivel on a vertical axis, and with vertical travel to dissipate loads. A separate heavy structure is necessary to carry these heavy loads into the airship car or framing, and to carry the high inertia loads from engines to the landing gear in hard landings. All these factors lead to excessive complexity, aerodynamic drag, and weight. Present landing gear must be locked in a crosswise position when the airship is moored and, due to their limited ground contact area and the constant pitching and rolling of the airship as it rotates or yaws about its nose attachment with changes in wind direction, often wear circular ruts in the landing field. Earlier airships sometimes had an inflated "bumping bag" to cushion the initial shock of landing. While these had a larger contact area, they included no provision for rotable contact with the ground so were not left in ground contact after landing, and large ground crews were required to hangar the airship or attach it to a high mooring mast.

Some airships have had air inflated bumper bags installed under engines and allowed them to deflect (with propellers stopped horizontally) in an upward only sense in hard landings, but no other attempt has been made to allow dissipation of excessive inertia loadings on engine mountings of airships. While the flexible nature of non rigid airships allows some resiliency of the tail fin mounting, this too is inadequate to dissipate excessive loads, while often too resilient as to maintain an even slack in attached control cables.

Large rigid airships sometimes used a weighted "riding out car" running on a circular track and to which the lower tail fin was attached after landing, with some resiliency. This necessitated the expense and complication of the track and car at each landing field. Because of the inadequacy of handling lines only for control of the rear of the airship during movement in and out of hangars, the largest airships sometimes used a weighted mechanical "stern beam" which rode on rails entering the hangar. This was best developed for the very large U.S. airship, the "Macon". This included a resilient attachment for the tail fin to it in an attempt to reduce loads to the airship structure, but again was an expensive complication and with limited travel to dissipate loads.

From this discussion of the prior art we can see that past and present airships were and are labor intensive to operate, damage prone, often lacking in passenger comfort, and aerodynamically inefficient. For airships to achieve their full potential, a great need exists to correct these deficiencies.

OBJECTS AND ADVANTAGES

Accordingly, several objects and advantages of the various interrelated features of my invention are:

a) to reduce the chance of damage to the airship structure from excessive loads to the tail fins.

b) to provide for the deflection of excessive tail fin aerodynamic or ground contact forces and thus minimize structural weight and increase passenger comfort and safety.

c) to provide a substantial yet resilient protection of rear propellers from ground strikes.

d) to allow the engines of airships to be resiliently attached to the Airship without additional components or structure.

e) by this resilient attachment to allow engine inertia loads in landing to be taken mainly by the landing gear rather than through the airship frame structure.

f) to provide for the practical and resilient mounting of engines far from passengers and thus increase safety and reduce the discomforts of noise and vibration;

g) to increase stability by safely allowing a reduced concentration of mass in the middle portion of airships;

h) by resilient attachment of tail fins to allow a simple fixed landing gear at the rear of airships without adding unduly to height, risk of catching on obstacles, or aerodynamic drag.

i) to reduce the need for ground crew and risk of accident damage by safely allowing tail fin ground contact.

j) to provide two effective landing gear with a large ground contact area at the rear of airships, and thus allow control of "kiting" and roll when moored, as well as reduce damage to fields.

k) to thus provide a more stable, and lower, platform for passenger and cargo entry and exit when moored;

l) to provide safe, accurate, and resilient means to locate the rear of airships for hangaring and movement near obstacles;

All the above objects and advantages can provide improved safety of airships, while enhancing control and increasing structural and aerodynamic efficiency. These and further objects and advantages will become apparent from a consideration of the following drawings and descriptions.

DRAWING FIGURES

REFERENCE NUMERALS IN DRAWINGS

Figure 1:
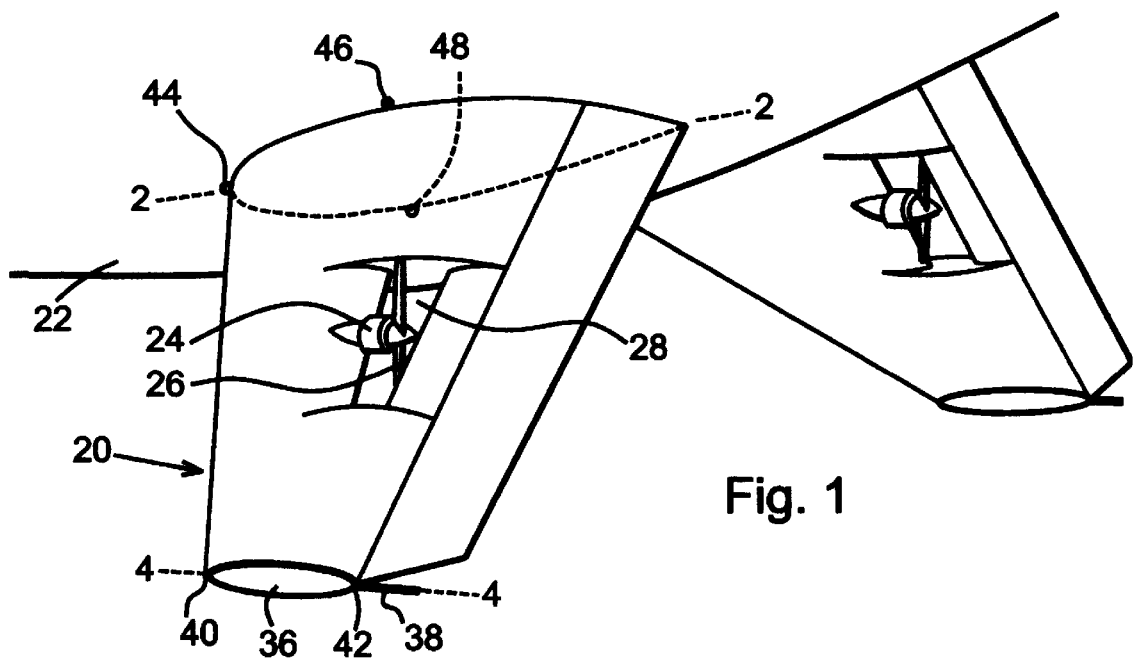
FIG. 1 is a perspective view of the left rear of an airship, showing details of tail fin construction of this and related and copending patents by the inventor.

Line 2—2 Plane of tail fin attachment to hull
Line 4—4 Landing roller axis of rotation
20. Tail fin
22. Airship hull
24. Engine
26. Propeller
28. Opening
36. Landing roller
38. Shaft
40. Forward bearing
42. Rear bearing
44. Forward attachment
46. Upper attachment
48. Lower attachment
104. Propeller swept area
106. Tail fin root contour
108. Hinge axis for upward movement
110. Hinge axis for downward movement
111. Tail fin normal position
112. Deflection due to aerodynamic load

DESCRIPTION OF THE INVENTION

A perspective view of the left rear of an airship featuring the preferred embodiment of the airship tail attachment of the present invention is shown in FIG. 1. In this illustration an inverted "V" tail fin mounting configuration is shown, though the present invention is also easily adaptable in whole or in part to other configurations.

In FIG. 1, a port or left tail fin (20) is shown along with its area of attachment to an airship hull (22). A driving engine (24) is mounted ahead of and drives a propeller (26) set in an opening (28) in the structure of the tail fin (20). An aerodynamically shaped landing roller (36) is rotably mounted on a shaft (38) at the lower tip of the tail fin along a landing roller axis of rotation (4—4). A forward bearing (40) and rear bearing (42) support the landing roller (36). The attachment of the tail fin (20) to the airship hull (22) is along a plane of attachment (2—2) by means of a forward attachment (44), an upper attachment (46), and a lower attachment (48).

Figure 2:
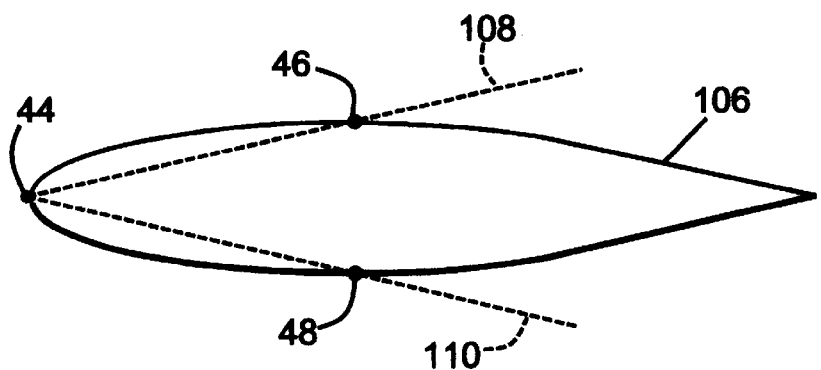
FIG. 2 is a view along 2—2 of FIG. 1, showing tail fin attachment and hinge axii.

In FIG. 2 the plane of attachment of the airship tail fin is shown, with a tail fin root contour (106), the forward attachment (44), the upper attachment (46), the lower attachment (48), a hinge axis for upward movement (108), and a hinge axis for downward movement (110). The forward attachment (44) is flexible but not elastic in normal operation, although it may be mounted to deflect under loads otherwise capable of damaging the airship structure. The upper and lower attachments (46 and 48) are flexible under compressive loads and elastic under tension loads as desired. The attachments may be rubber shock cord, hydraulic cylinders normally retracted against rubber stops, or of other suitable construction. It will be appreciated that the same hinge axis could be fixed by flexible and elastic attachments at any two or more locations along a hinge line, aft of the junction of the hinge lines at attachment (44). The forward attachment is here shared for simplicity of construction. Attachments may also be resilient in compression at a stress higher than their elasticity, as further protection against damaging loads to the airship hull, especially those acting directly inward.

Figure 3:
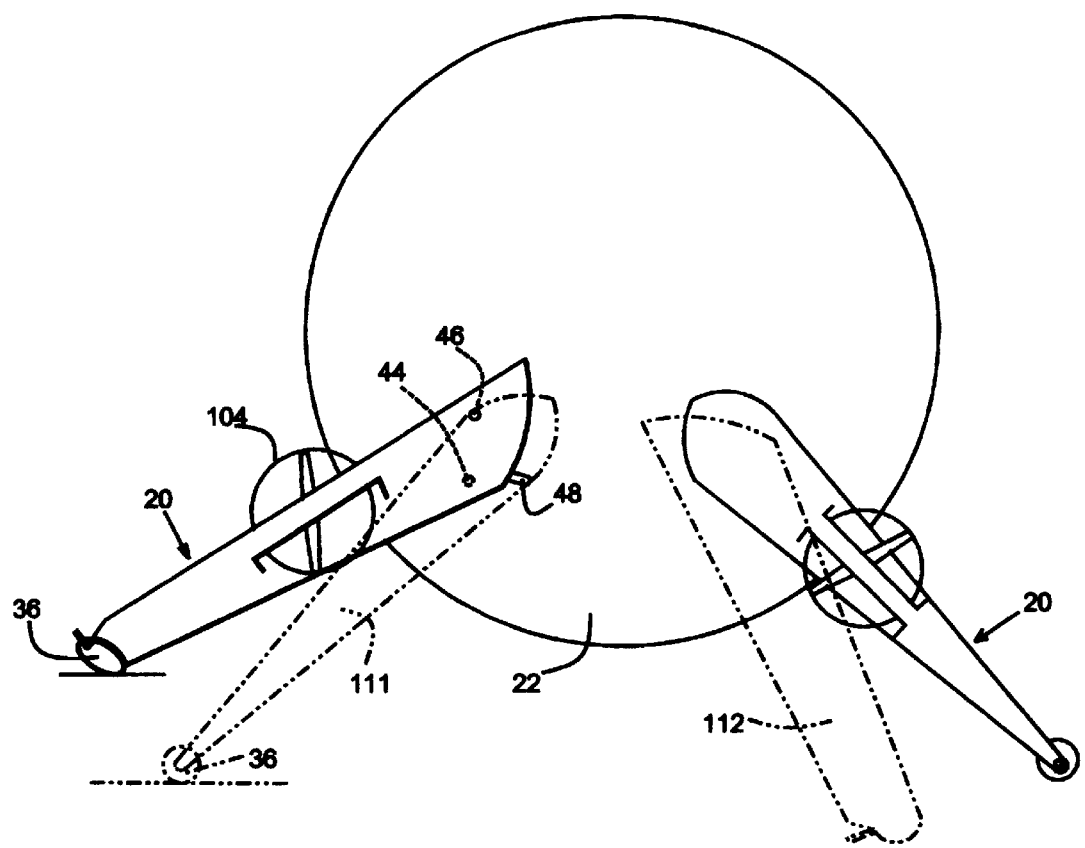
FIG. 3 is a rear elevation of the airship of FIG. 1, demonstrating tail fin deflection under excessive loads.

In FIG. 3 the operation of the attachment system under excessive loading is shown. The left tail fin is shown deflected by a ground contact load. The tail fin normal position is shown by phantom lines (111). Two important effects are noticed. The upward deflection of the tail fin (20) has caused the elastic lower attachment (48) to stretch, absorbing and deflecting the energy of contact and allowing the tail fin to pivot along axis (108) of FIG. 2. Due to the angular inclination of the axis (108) to the longitudinal axis of the tail fin causes the trailing edge of the tail fin to deflect upward more than the leading edge, thus changing the angle of attack of the tail fin relative to the airship hull (22). In the case of ground contact as shown on the left fin the area of ground contact of the landing roller (36) will shift forward with increased deflection, putting more loading upon the landing roller forward bearing (40 of FIG. 1) where its load can be taken more directly into the structure of the tail fin (20).

A deflection due to excessive aerodynamic loading is shown by phantom lines (112) on the right tail fin. Here the trailing edge deflects downward farther than the leading edge as permitted by the elasticity of the upper attachment (46) and the tail fin deflects upon the axis (110) of FIG. 2. The effective change of the angle of attack of the tail fin will reduce the angle of attack to the airflow causing the excessive loading, thus limiting the load and protecting the airship structure and occupants from excessive or uncomfortable loads.

Figure 4:
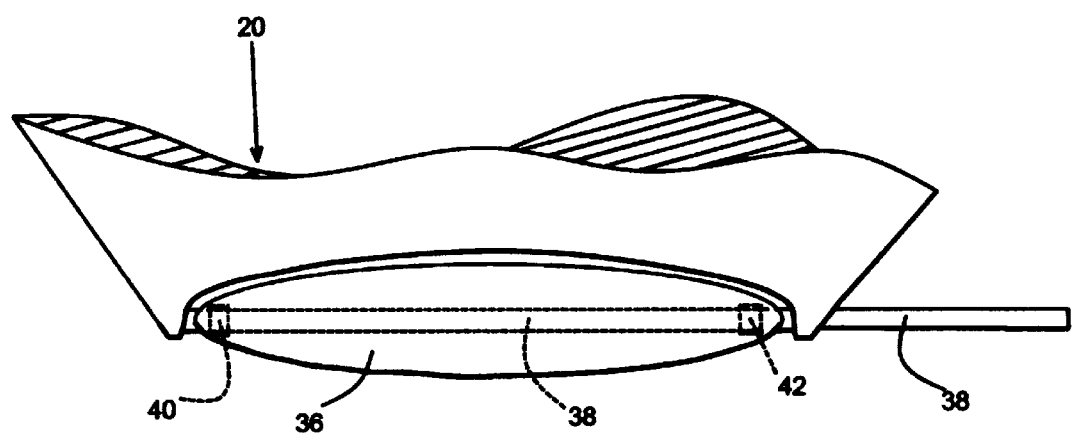
FIG. 4 is an enlarged fragmentary view along 4—4 of FIG. 1, showing the landing roller in side elevation.

In FIG. 4 the landing roller (36) is shown mounted to the lower portion of the tail fin (20). The shaft (38) mounts in the forward bearing (40) and rear bearing (42) to allow rotation of the landing roller (36). The shaft (38) could also be fixed to the tail fin (20) and hold bearings on which the landing roller (36) may rotate.

The shaft (38) also serves as a convenient hand hold or handling rope attachment for manual handling of the rear of the airship. For purposes of strength with light weight the shaft (38) could be a hollow tube, allowing its use as a convenient water, fuel, engine exhaust or air conduit. The shaft (38) may be of a sufficient diameter (1.5 inches, for example) to allow comfortable ground handling with very little danger of catching clothing or obstacles on its smooth surface. Using it as such the airship may be steadied as it is moved a sufficient distance away from a hangar to allow safe takeoff, or mechanically securely located for movement in and out of the hangar, with the resilient tail fin attachment protecting the airship structure from excessive loads. Attaching weights or any mechanical hold down system to the shaft (38) or other convenient point of the tail fin (20) to maintain the airship attitude when moored gives the security of two widely separated locators at the rear of the airship, with resilience provided by the tail fin attachment. In practice the lower fins are normally allowed to weathervane with changes in wind direction when the airship is parked free of obstacles. Thus any weights added could be supported on the rotable landing roller (36) as it rotates with changes in wind direction.

CONCLUSION, RAMIFICATIONS, AND SCOPE OF INVENTION

The reader will see that the tail fin attachment features of this invention can be very advantageous over the prior art and interrelated in that the normally separate and complex structures of engine supports and landing gear are combined with the airship tail fins into a simple multi-purpose structure. This in turn is resiliently mounted to the airship hull and also conducive to greatly improved ground handling of the rear of the airship. Stresses to the airship structure and passenger discomfort are deflected by the simple means of tail fin attachment to the airship hull. All of these advantages are gained without adding major components.

With modern lightweight materials and engines, tail fins including all the features of the present invention need not weigh any more than past and present tail fins of conventional construction, thus leading to an overall weight saving over the present inefficient airships, as well as greatly reduced wind resistance. While generally more applicable to the construction of semirigid and rigid airships having a rigid framing, features of this invention could be used or adapted to nonrigid airships also, especially if provided with an internal subframe for tail fin attachment, as has been proposed in the literature.

It will be appreciated that the tail fin attachment of the present invention could also be used in the mounting of lifting or control surfaces of airplanes, helicopters, submarines, or hydrocraft.

Some modifications and variations become evident to one skilled in the art. In smaller airships the hollow shaft of the landing roller could be angled up at the aft end to be more convenient for manual ground handling. A single hydraulic damper could be mounted between the tail fin and the airship hull at a location centered between the upper and lower fin attachments and thus damp movements in both upward and downward deflections. A means of adjusting or varying the length or locations of the tail fin attachments could allow aerodynamic trim adjustment or controlled deflection for greater maneuverability.

The above descriptions contain some of the many possible uses of the various aspects and embodiments of the present inventions. These should not be construed as limiting the scope of the invention, but rather as exemplifications of the preferred embodiment thereof, and especially its application to airships. Thus, the scope of the invention should be determined not by the embodiments illustrated, but by the amended claims and their legal equivalents.

What I claim is:

1. A method of attaching airfoils or hydrofoils, comprising:
   a. an airfoil or hydrofoil,
   b. an aircraft or hydrocraft structure,
   c. a means of attachment for upward deflection of said airfoil or hydrofoil relative to said aircraft or hydrocraft structure, defining an axis of rotation with upward deflection inclined upward toward the rear, whereby with upward deflection the trailing edge of said airfoil or hydrofoil will deflect more than the leading edge of said airfoil or hydrofoil, thus effectively reducing its angle of attack relative to disturbing airflow or waterflow, and
   d. a means of attachment for downward deflection of said airfoil or hydrofoil relative to said aircraft or hydrocraft structure, defining an axis of rotation with downward deflection inclined downward toward the rear, whereby with downward deflection the trailing edge of said airfoil or hydrofoil will deflect more than the leading edge of said airfoil or hydrofoil, thus effectively reducing its angle of attack relative to a disturbing airflow or waterflow.

2. The method of claim 1, wherein said means of attachment for upward deflection and said means of attachment for downward deflection include:
   a. a common flexible front attachment,
   b. a flexible and elastic upper attachment, and
   c. a flexible and elastic lower attachment.

3. The method of claim 1, wherein said airfoil attaches to an airplane structure.

4. The method of claim 3, wherein said means of attachment for upward deflection and said means of attachment for downward deflection include:
   a. common flexible front attachment,
   b. a flexible and elastic upper attachment, and
   c. a flexible and elastic lower attachment.

5. The method of claim 1, wherein said airfoil attaches to a dirigible airship structure.

6. The method of claim 5, wherein said means of attachment for upward deflection and said means of attachment for downward deflection include:
   a. a common flexible front attachment,
   b. a flexible and elastic upper attachment, and
   c. a flexible and elastic lower attachment.

7. In dirigible airships, a method of tail fin attachment comprising:
   a. an airship tail fin structure,
   b. an airship hull or framework,
   c. a means of attachment for upward deflection of said tail fin structure relative to said airship hull or framework, defining an axis of rotation with upward deflection inclined upward toward the rear, whereby with upward deflection the trailing edge of said tail fin structure will deflect more than the leading edge of said tail fin structure, thus effectively reducing its angle of attack relative to a disturbing airflow,
   d. a means of attachment for downward deflection of said tail fin structure relative to said airship hull or framework, defining an axis of rotation with downward deflection inclined downward toward the rear, whereby with downward deflection the trailing edge of said tail fin structure will deflect more than the leading edge of said tail fin structure, thus effectively reducing its angle of attack relative to a disturbing airflow, and
   e. an engine mounting on or within said tail fin structure, whereby engine loads are transmitted through, and dissipated by as necessary, said means of attachment to said airship hull or framework.

8. The method of claim 7, wherein said means of attachment for upward deflection and said means of
   a. a common flexible front attachment, and
   b. a flexible and elastic upper attachment, and
   c. a flexible and elastic lower attachment.

9. In dirigible airships, a method of tail fin attachment comprising:
   a. an airship tail fin structure,
   b. an airship hull or framework,
   c. a means of attachment for upward deflection of said tail fi structure relative to said airship hull or framework, defining an axis rotation with upward deflection inclined upward toward the rear, whereby with upward deflection the trailing edge of said tail fin structure will deflect more than the leading edge of said tail fin structure, thus effectively reducing its angle of attack relative to a disturbing airflow,
   d. a means of attachment for downward deflection of said tail fin structure relative to said airship hull or framework, defining an axis of rotation with downward deflection inclined downward toward the rear, whereby with downward deflection the trailing edge of said tail fin structure will deflect more than the leading edge of said tail fin structure, thus effectively reducing its angle of attack relative to a disturbing airflow; and
   e. a landing roller rotably mounted near the lower extremity of said tail fin structure, and rotating on an axis roughly parallel to the longitudinal axis of said airship hull or framework, whereby landing loads are transmitted through, and dissipated by as necessary, said resilient means of attachment to said airship hull or framework.

10. The method of claim 9, wherein said means of attachment for upward deflection and said means of attachment for downward deflection include:
    a. a common flexible front attachment,
    b. a flexible and elastic upper attachment, and
    c. a flexible and elastic lower attachment.

* * * * *